(12) United States Patent
Downey et al.

(10) Patent No.: US 12,064,712 B2
(45) Date of Patent: Aug. 20, 2024

(54) WATER TREATMENT APPARATUS AND METHOD OF USE

(71) Applicant: Newterra Ltd., Brockville (CA)

(72) Inventors: Jason Downey, Manotick (CA); Jeffrey Kempson, Brockville (CA); Stuart Wilkinson, Mississauga (CA)

(73) Assignee: Newterra Ltd., Brockville (CA)

( * ) Notice: Subject to any disclaimer, the term of this patent is extended or adjusted under 35 U.S.C. 154(b) by 221 days.

(21) Appl. No.: 16/776,201

(22) Filed: Jan. 29, 2020

(65) Prior Publication Data

US 2020/0164288 A1 May 28, 2020

Related U.S. Application Data

(63) Continuation-in-part of application No. 14/083,596, filed on Nov. 19, 2013, now abandoned.

(60) Provisional application No. 61/728,356, filed on Nov. 20, 2012.

(51) Int. Cl.
| | |
|---|---|
| *B01D 21/00* | (2006.01) |
| *B01D 21/02* | (2006.01) |
| *B01D 21/24* | (2006.01) |

(52) U.S. Cl.
CPC ......... *B01D 21/0024* (2013.01); *B01D 21/10* (2013.01); *B01D 21/2444* (2013.01)

(58) Field of Classification Search
None
See application file for complete search history.

(56) References Cited

U.S. PATENT DOCUMENTS

| | | | | |
|---|---|---|---|---|
| 2,118,157 | A | * | 5/1938 | Camp ................... B01D 21/18 210/519 |
| 2,140,059 | A | | 12/1938 | Simonsen |
| 3,628,667 | A | * | 12/1971 | Somora ............... B01D 21/283 210/519 |
| 4,003,832 | A | | 1/1977 | Henderson et al. |
| 4,642,191 | A | * | 2/1987 | Hill .................... B01D 21/2444 210/532.1 |
| 5,366,638 | A | | 11/1994 | Moore |
| 5,439,597 | A | | 8/1995 | Allen |
| 6,245,243 | B1 | | 6/2001 | Meurer |
| 2002/0166576 | A1 | * | 11/2002 | Hyosong ........... B01D 21/0093 134/25.1 |

FOREIGN PATENT DOCUMENTS

| | | | | |
|---|---|---|---|---|
| EP | 0128122 | A1 * | 12/1984 | ......... B01D 21/2444 |
| EP | 0128122 | A1 | 12/1984 | |

* cited by examiner

*Primary Examiner* — Jason M Greene
*Assistant Examiner* — Eric J McCullough
(74) *Attorney, Agent, or Firm* — Albert W. Watkins

(57) ABSTRACT

Apparatus for treating water has a container having a clarification zone, a water entry arrangement for flowing water into the clarification zone, and water exit units mounted to the container for at least partial immersion in the water in the clarification zone. Each water exit unit has a transfer channel for transferring a flow of clarified water from a layer of the water to a predetermined depth in the clarification zone and to direct the received clarified water to a water exit arrangement. A height adjustment mechanism is used for differentially adjusting the heights of the water exit units and their transfer channels relative to the container so as to compensate for any angular tilt of the container owing to the container being deployed on sloping ground.

8 Claims, 9 Drawing Sheets

WATER TREATMENT APPARATUS AND METHOD OF USE

FIELD OF THE INVENTION

This invention relates to a water treatment apparatus and its use and has particular but not exclusive application to prefabricated wastewater water treatment containers intended to be shipped in prefabricated form for deployment at sites where the ground may not be flat.

DESCRIPTION OF RELATED ART

Wastewater clarifiers are used to remove suspended solids from water such as grey water, effluent from mining, industrial and construction sites, and sewage. They work by the process of flocculation in which suspended microscopic particles in the range 1 to 1000 micrometers are caused to come out of suspension as flakes or "floc". Known wastewater clarifiers may take the form of circular, square or rectangular containers having a wastewater inlet and cleansed water outlet and a settling zone. They may or may not use clarification media such as a matrix of clarification tubes or slant plates (lamella) to stimulate separation and settlement of solids from the wastewater.

Typically a rectangular tube clarifier container that is 7' wide×9' tall (for a water depth of 8')×32' long has wastewater entering at one 7'×9' end, passing down the length of the container through a settling zone and then a clarifying zone, and exiting as clarified water at the outlet end. Over the settling zone, the wastewater motion is stabilized to render the wastewater more quiescent for subsequent processing in the clarifying zone. In the clarifying zone, flocculation and separation of the downwardly falling solids from the upwardly moving water occurs provided that the water is not turbulent, but has an even flow throughout the clarifying zone. Clarification media such as tube media may be located in the clarification zone to increase the rate at which particles flocculate and drop to the bottom of the clarifier as sludge. The stabilization zone might be of the order of 12' long, the actual length being chosen depending on the wastewater flow rate. This leaves only a 20'×7' area, when considered in plan view, in which to site the tube clarification media. It is usual to fill the whole of this area of the container with clarification media. This means that over the area of the zone where the clarification media is situated, there is no operator access to the sludge collection zone.

There is a requirement for mobile units that can be pre-fabricated and shipped to deployment sites. The requirement for transporting in conventional shipping container sizes places limitations on the area footprint and height of prefabricated mobile units. However, users demand high throughput and it is desirable that limits on the unit size owing to the demands of transportation should not detrimentally affect the rate at which wastewater is handled by such units. Once delivered at in installation site, it is often desirable that the clarifier units be put into service rapidly even if the installation is less than ideal in terms of ground slope. Furthermore, it is desirable that the installation should to the extent possible enable continuous operation without the operation being adversely affected by sludge build-up.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY

PREFERRED EMBODIMENTS

Figure 1:
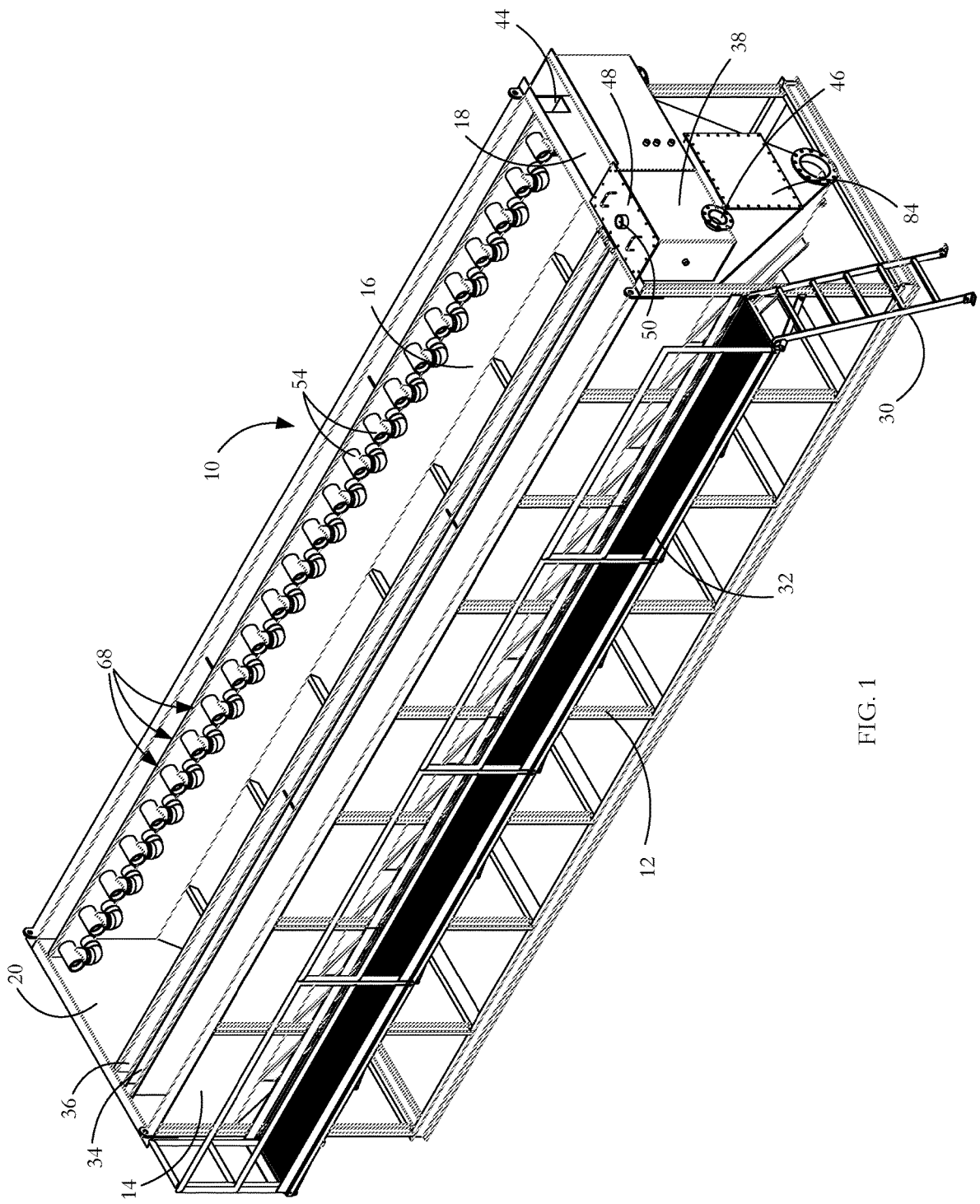
FIG. 1 is perspective view of a water clarifying apparatus according to an embodiment of the invention.
Figure 2A:
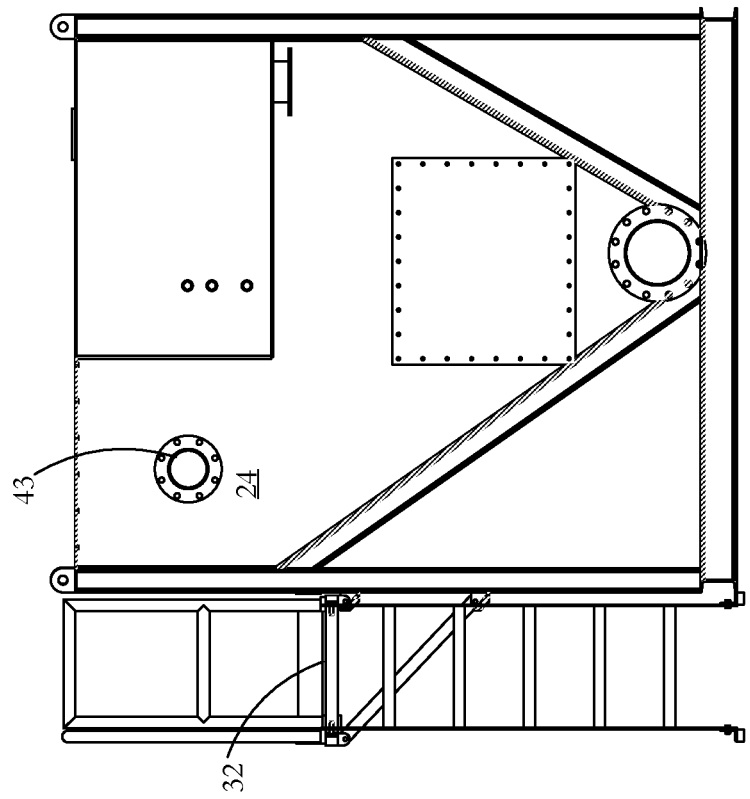
FIG. 2A is a front end view of apparatus similar to that shown in FIG. 1 but showing an alternative form of conduit for distributing wastewater in the apparatus.
Figure 2:
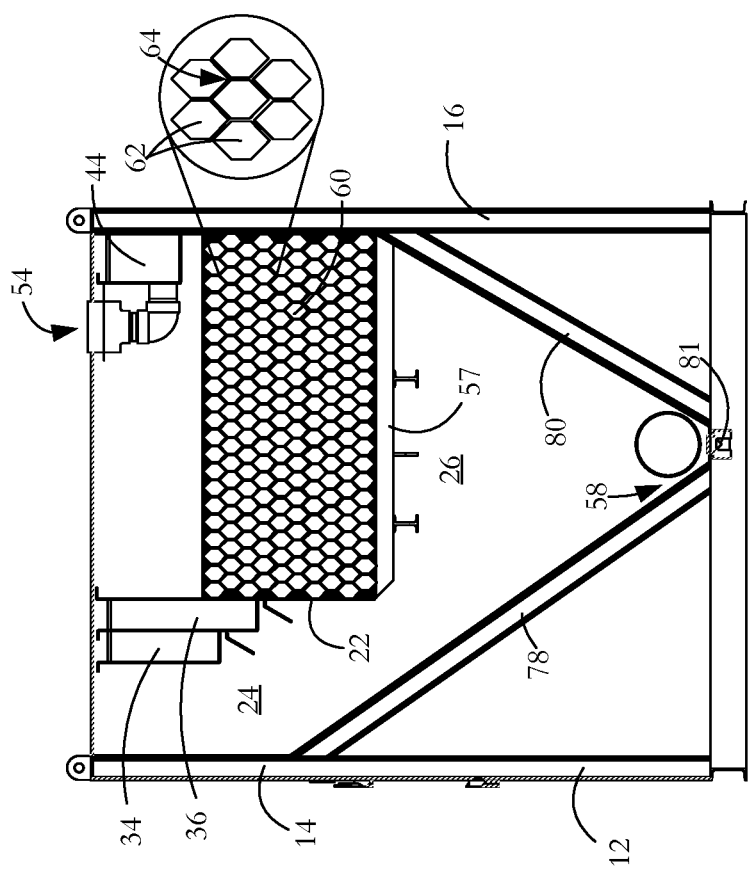
FIG. 2 is a cross-sectional view of the apparatus of FIG. 1 showing installed clarification media.

Referring in detail to FIGS. 1 and 2, there is shown clarifier apparatus for clarifying wastewater. The clarifying apparatus has a rectangular box container having an outer support frame 12, sides 14, 16 and ends 18, 20. As shown in FIG. 2, a wall 22 divides the clarifier along its length into a settling zone 24 of the order of 2 feet in width and clarification zone 26 of the order of 6 feet in width. The box container has a V-form floor consisting of sloping walls 78, 80 supported by the support frame 12. Manual access to the clarifier for checking its operating state while functioning to clarify wastewater is enabled by ladder 30 and catwalk 32.

Figure 3:
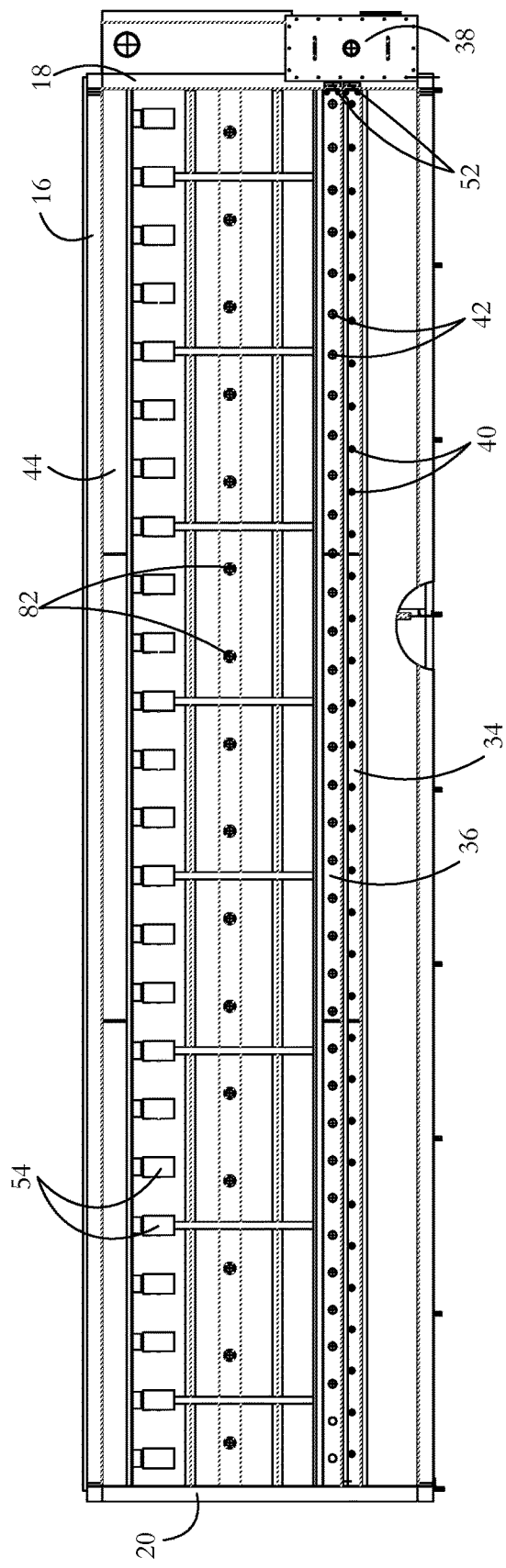
FIG. 3 is a plan view of a part of the apparatus of FIG. 1.

Extending the full length of the container are two troughs 34, 36, the trough 36 being for handling wastewater processing at a higher rate than that of the trough 34. At the end wall 18, the troughs are connected to a wastewater inlet tank 38 through which wastewater is pumped into one or other of the troughs 34, 36. As shown in FIG. 3, there are holes 40, 42 in the bottoms of the respective troughs 34, 36 through which wastewater pumped into the troughs flows out into the settling zone 24. The clarifying apparatus illustrated has a two-directional flow of wastewater being treated. The wastewater is initially delivered to one of the troughs 34, 36 in a flow extending along the longer aspect of the box container and then, once driven from the trough 34 or 36 by further pumping of wastewater into the trough, it flows evenly through the clarification zone 26 to an outlet trough 44, and flows along the exit tough to an outlet tank 45.

Referring back to FIG. 1, wastewater is received into the clarifier through the inlet tank 38. The wastewater is in turbulent motion in the tank 38 which ensures that fine particulate solids are retained in suspension and so kept mobile while reducing the energy of wastewater entering the tank at high velocity through the inlet port 46. The inlet tank has a gasketed lid 48 with a vent pipe 50 to prevent overflow in the case of surges of incoming wastewater. The wastewater is pre-treated to remove large solid materials before being piped at a controlled rate into the inlet tank 38. The presence of the tank 38 provides a measure of stabilization for the wastewater before it flows from the tank 38 into one or other of the troughs 34, 36 depending on whether a respective gate 52 is open or closed. In order to achieve effective operation at high throughput, it is important that the flow of wastewater from the trough 34, 36 into the settling zone 24 is evenly distributed down the length of the clarifier. If flow is slower than optimal, the throughput is not maximized. If the flow is faster than optimal, the water entering the exit trough 44 may not be evenly clarified along the length of the clarifier.

Referring again to FIG. 3, the holes 40, 42 along the bottom of the troughs 34, 36 are circular apertures but may have different shapes, with the holes in each trough having identical aperture size and being selected for achieving a desired flow rate. For achieving balanced, even flow across the clarifier throughout its length, the spacing of adjacent holes shortens with distance away from the wastewater inlet end 18. As the water flows through the troughs 34, 36, friction losses occur and as a result there is pressure head build-up in the trough. The pressure head build-up is higher at the inlet end 18 of the trough and drops to almost nothing at the far end 16 of the trough where the water is moving much more slowly. The varying height of water increases the water pressure at the holes 40, 42 closer to the inlet end 18 and, in the absence of the progressive spacing variation, would allow a higher flow rate into the clarification zone than the holes further from the inlet end. The differential spacing ensures that even if less water is flowing from the downstream holes than the upstream holes, the total average flow rate per linear foot along the clarifier is relatively constant. In one arrangement, a low flow rate trough (50 to 440 gallons per minute) has holes of diameter 1.5 inches and a hole spacing changing progressively from 12 inches at the inlet end to 11.43 inches at the outlet end 32 feet away from the inlet. The high flow rate trough (400 to 1600 gallons per minute) has holes of diameter 2.1 inches and a hole spacing changing progressively from 12 inches at the inlet end to 10.22 inches at the outlet end. It will be appreciated that other dimensions and techniques can be used to achieve the desired even flow into the clarification zone. For example, the size and/or shape and/or spacing of the holes can be varied to accommodate, for example, clarifiers of different length or design flow rates.

The troughs are rectangular in section, with the high capacity trough 36 having a greater depth than the low capacity trough 34 to prevent spillage. The frictional forces mentioned previously are a function of the water velocity through the troughs and at high flow rate, the friction forces cause the development of a pressure head of water at the inlet end. If the head is too high, the wastewater at the trough inlet end will overflow and so the trough has a depth at which the combination of the operating flow rate and the friction in the trough are not sufficient to cause overflow. The trough 34, which has smaller holes, is used to achieve a flow rate in the range of 200-400 gallons per minute (gpm) while the trough 36, with larger holes, is used to achieve a flow rate in the range 400-800 gpm. The operator opens or closes the respective gate 52 at the entrance of the troughs to channel flow into the appropriate trough depending on the desired flow rate.

Extending along the other side of the container is the clarified water collection trough 44 which receives water from water exit units 54 mounted along the length of the container. In use, wastewater is piped into the inlet tank 38, flows out of the tank into one of the troughs 34, 36, enters the settling zone 24 from the active one of the troughs 34, 36, passes through the clarification zone, and exits at the side 16. In the clarification zone 26, colloidal particles in the wastewater undergo flocculation, a process in which small particles accumulate to form larger particles. The larger particles then settle in the settling zone so clarifying the water in the upper region of the settling zone.

The inlet flow is not significantly affected by variability of ground level when the clarifier is sited on somewhat sloping ground. Because the holes 40, 42 are deep under water and the size of the area of the trough is large, variability of flow through the holes as a result of ground level variation along the length of the clarifier is insignificant. It will be appreciated however that for materially sloping ground, the orientation of the inlet trough 34, 36 can be made field adjustable.

It is useful to have different throughput rates available so as to accommodate differing demands at the installation site. In the example shown, two troughs 34, 36 with inlet delivery means and outlet holes 40, 42 tailored in size and flow rates are used to obtain desired throughputs at the clarifying apparatus. The clarifying apparatus can alternatively be made with a larger range of inlet troughs. In another alternative, a single trough that is adjustable to permit greater or lesser wastewater input can be used.

Figure 2B:
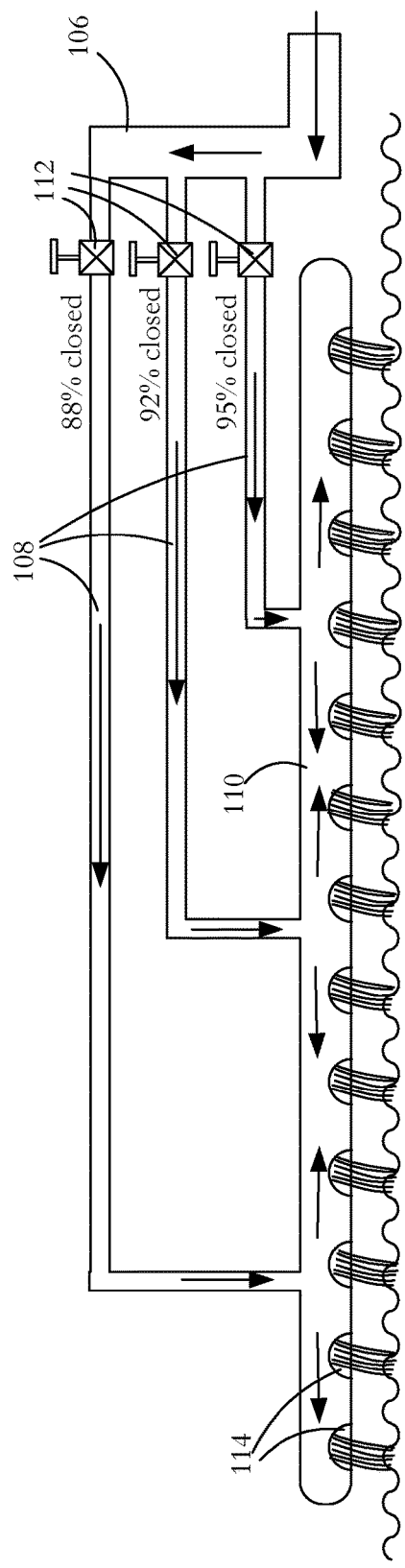
FIG. 2B is a side view of apparatus similar to that shown in FIG. 1, but showing an alternative arrangement for distributing wastewater in the apparatus.

As an alternative to the troughs shown in FIGS. 1 and 2, the wastewater inlet arrangement can use a pipe 43 as shown in FIG. 2A. As in the case of the troughs, water outlet ports in the wall of the pipe (not shown) are arranged so that an even downward flow rate from the pipe into the settling zone 24 is obtained along the length of the pipe 43. Even flow rate is achieved by progressively altering the spacing of equally sized outlet ports in the pipe, by altering the size of the aperture of equally spaced ports progressively along the pipe, or by other means. In a manner similar to that described with respect to the troughs, an additional, larger flow pipe can be used to accommodate a higher wastewater input rate or a single pipe that is adjustable to permit greater or lesser wastewater input can be used. In a further alternative as shown in FIG. 2B, a distributor pipe 106 is used to pipe wastewater into the tank, with the distributor pipe 106 having multiple connection passages108 to enable the wastewater to flow from the distributor pipe into a diffuser pipe 110. Provided that the pressure drop through the distributor connection passages 108, as determined by the setting of valves 112, are significantly higher than the pressure drop of water flowing axially through the distributor pipe at all flow rates, then the diffuser pipe 110 receives a balanced water flow rate along its length. Equal aperture outlet ports114 in the diffuser pipe can then be equally spaced along the diffuser pipe length because there is close to the same flow rate through each port. To work at varying flows, the operator would have to adjust the setting of the valves 112. The orifices of the ports 114 are at least partly out of the water in the settling zone 24 so that the operator can see the volume of water flowing out of the ports 114 into the tank and adjust the valves 112 based on a visual gauge of balanced flow.

The inlet conduit arrangement is designed so that to the extent possible, sludge, dirt and debris are cleared out of the conduit. Consequently, the outlet ports are oriented so that the wastewater flows downwardly to exit the conduit. In addition the flow is made sufficiently fast that solid material is moved along and out of the conduit by the water flow. The escape speed of wastewater at the outlet ports is made sufficiently low that it does not cause significant mixing to the extent that effect that floc particles are sheared which would reduce the performance of the apparatus.

In order to obtain high throughput of wastewater, it is important that smaller particles flocculate rapidly to form larger particles and it is desirable also that the larger particles drop quickly through the settling and clarification zones 24, 26. To influence this positively, the wastewater is stabilized as quickly and as fully as possible. As indicated previously, the inlet tank 38 forms a first stage of stabilization as the wastewater travelling at high rate through the inlet pipe is brought to a halt in the tank 38. The wastewater flows from the tank interior into the selected trough 34, 36 through the appropriately operated gate 52 which is larger than the size of inlet port 46 and which receives water generally from the tank interior. A second stabilization stage occurs at deflectors 56 (FIG. 2) which are associated with each of the holes 40, 42 and act to diffuse the flow of water from the holes and so prevent jets of water from disturbing settling solids in the clarification zone 26 and settled solids in the crook 58 of the V-form floor 78, 80.

The deflectors 56 spread the wastewater that is injected through the holes 40, 42 both in a direction along the trough 34, 36 and in a plane perpendicular to the trough length. The function of the deflectors 56 is to minimize undesirable currents in the wastewater in the settling and clarification zones 24, 26 which might otherwise adversely impact both flocculation and settling. If the deflectors 56 were not in place, the speed of water injected through the holes 40, 42 might result in eddy currents having a flow speed and extent which are much greater than obtained with the deflectors in place. Preventing undesirable currents also increases the likelihood of achieving slow, even flow of wastewater from near the holes 40, 42 across the container to the water exit pipes 44.

Figure 4:
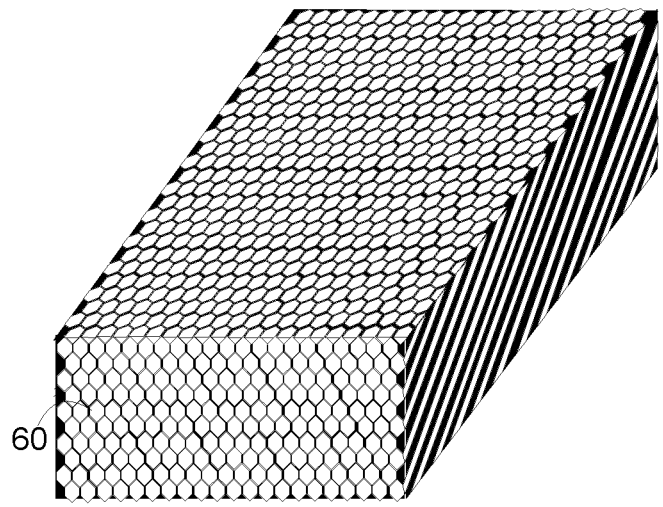
FIG. 4 is a perspective view of clarification media suitable for use in the apparatus of FIG. 1.
Figure 5:
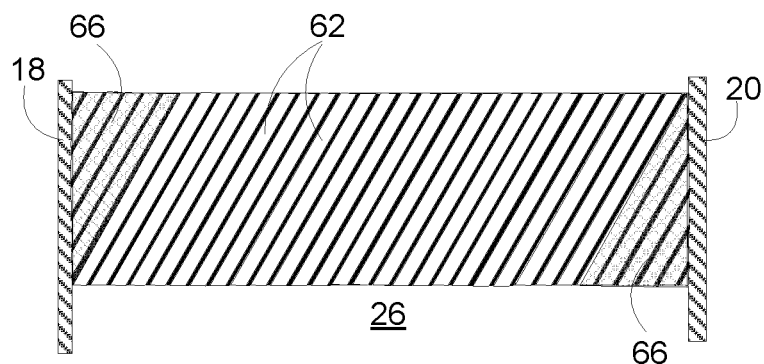
FIG. 5 is a side view of the clarification media of FIG. 4 showing the clarifying media as positioned between end walls of the apparatus of FIG. 1.

A further optional technique for increasing the rate of flocculation is to use a matrix of clarification media such as tube media as shown in FIGS. 2, 4 and 5. A tube media matrix 60 is supported on a supporting frame 57 and fills an area of the clarification zone 26 from just below the draw level of water exit units 54 to the top of the V-wall at the outlet side. Influenced by the continued injection of wastewater into one of the inlet troughs and by the continuous drawing off of cleaned effluent at the water exit units 54, the wastewater flows slowly from the settling zone 24 to the clarification zone 26 below the tube media matrix 60. The wastewater is drawn up through the media tubes 62 with solids falling out in the media and sliding down the tubes 62. The sediment falls into the bottom 58 of the clarifier below the tube media. The clarified water flows out of the tops of the tubes 62 and into the water exit units 54 which function to draw wastewater evenly across the media bed to ensure even flow distribution. Although the wastewater can be viewed as flowing across the clarifier, the tubes 62 of the tube media 60 slope along the length of the clarifier, as shown in FIG. 5.

The clarification media illustrated are tube media. The individual tubes 62 are made of lightweight PVC and slope at an angle to the horizontal. The tubes 62 are of hexagonal cross-section which allows close packing. In the tube orientation adopted, and shown in the scrap, larger scale view associated with FIG. 2, each tube 62 presents a downwardly pointed V-formation 64 which tends to channel particles to encourage flocculation. The interior surface of the tubes 62 cause friction to be applied to the particles, this having a greater effect than friction experienced by the slowly upwardly flowing water, so encouraging separation of the two phases. The clarification media can be constructed of alternative components such as sloping lamellar plates (not shown). The tube media fill the whole of the area of the clarification zone 26 between the two ends 18, 20 of the container and between the wall 22 and side 16. The pipes are sloped at an angle of about 60 degrees to most effectively clarify the wastewater as it flows slowly along them. In order to maximize the use of space in the clarifier, the tubes 62 are sloped in the long aspect of the container as shown in FIG. 5 rather than in the direction of flow of water across the container. This results in "null" regions 66 of smaller volume in comparison with clarifiers of similar volume that have a square or short box aspect.

Tube and parallel plate settling media increase the settling capacity of the clarifier by reducing the vertical distance a particle must traverse before agglomerating to form larger particles. Consequently, the particle settling depth is significantly less than the settling depth of a clarifier which does not have clarification media, so reducing settling times. The tube media capture fine floc particles that escape the clarification zone 26 beneath the tube media and allow larger floc particles to travel to the tank bottom in a more easily settled form. Such clarification media can also reduce the footprint required compared with a clarifier without such media.

Figure 6:
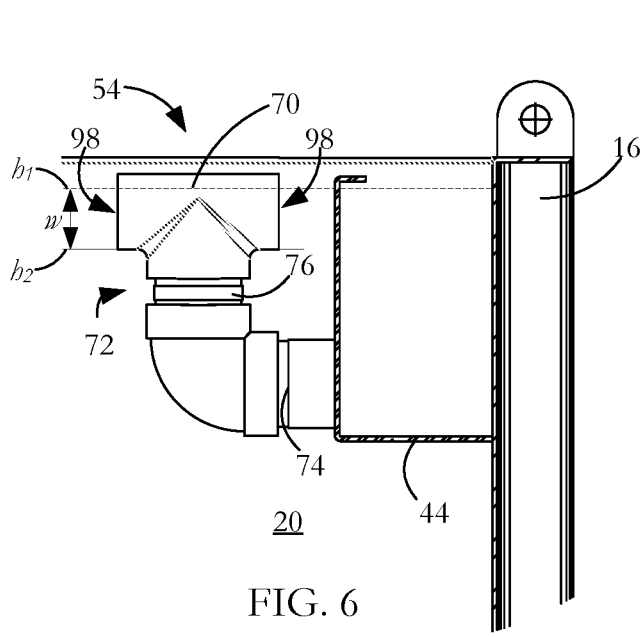
FIG. 6 is a detail view of a water exit water exit pipe used in the apparatus illustrated in FIG. 1.
Figure 7:
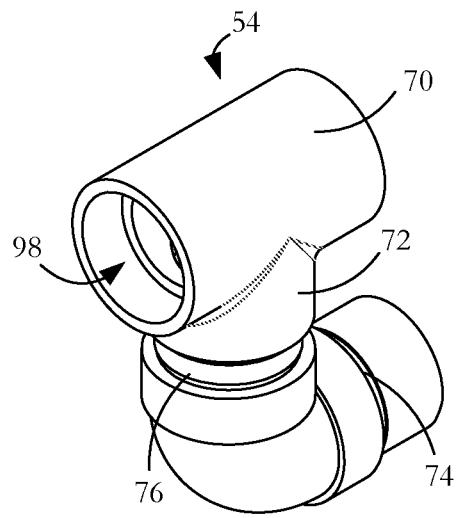
FIG. 7 is a perspective view of the water exit water exit pipe of FIG. 6.

Another requirement in order to achieve even flow of wastewater across the tank is that the rate at which water exits the container is the same regardless of the position along the container. If this were not the case, then the flow rate across the tank would be higher where a relatively higher flow of water flows into the exit trough 44. Particularly in the case where the clarifier is prefabricated and shipped to an installation site, it may be difficult to find a location where the ground is perfectly level. Consequently, when the container is set down on the ground, it may tilt slightly in an end to end direction, in a side to side direction, or in a direction that is a combination of the two. Such sites are typically temporary sites such as construction sites or emergency service sites. However, they may be more permanent sites where the clarifier is to be rapidly installed and deployed. As shown in FIG. 1, drain points 68 for the cleaned water are occupied by water exit units 54 that are mounted inboard of the exit trough 44. The water exit units 54 collect water at a rate determined by the relative heights of the surface of the water in the box container and the height of the horizontal pipe sections 70 as shown in FIGS. 6 and 7. The received water falls under gravity down a vertical pipe section 72 of the water exit pipe and then flows into the exit trough 44 through horizontal pipe section 74. The height of each of the water exit pipes 70 is individually adjustable at a coupling 76 to enable adjustment of the thickness and position of a layer of water drawn by gravity into the exit trough 44. Consequently, if the clarifier is set down on ground that is not perfectly level, the operator can adjust each of the outlet water exit units 54 as necessary so that the horizontal pipe sections 70 are all at the same height and draw evenly from a common layer of water as water is drawn through the system. Water is drawn evenly out of the clarifier down its length to ensure even flow through the clarification media 60. Evenness of flow is improved by being induced by gravity. It will be understood that the use of the term "common layer" refers to a layer of water that is drawn under gravity into orifices 98 of the water exit units 54. In the FIG. 6 embodiment, at the orifices themselves, the common layer is precisely defined by the position and configuration of the orifices. Upstream of the water flow as it converges at the orifices 98, the layer is somewhat vertically spread but, provided the flow towards the skim units is even, the exit units still draw from a generally common layer of the water in the container. In the embodiment shown in FIGS. 1 and 6, the water exit units 54 are identical to each other. Further, each of the horizontal pipe sections 70 has circular orifices 98 at each end to draw off water from a layer of width w extending between height b2 marking the bottom of the orifices 98 and height $h_1$ marking the surface level of the water in the container. The bottom point of the orifices at the inner end of the pipe sections 70 are linearly aligned with each other and, when the container rests on flat ground, are parallel with the container sides and base. This means that the pipe sections 70 draw exactly the same width between heights $h_1$ and $h_2$ regardless of the position along the length of the container.

Figure 6A:
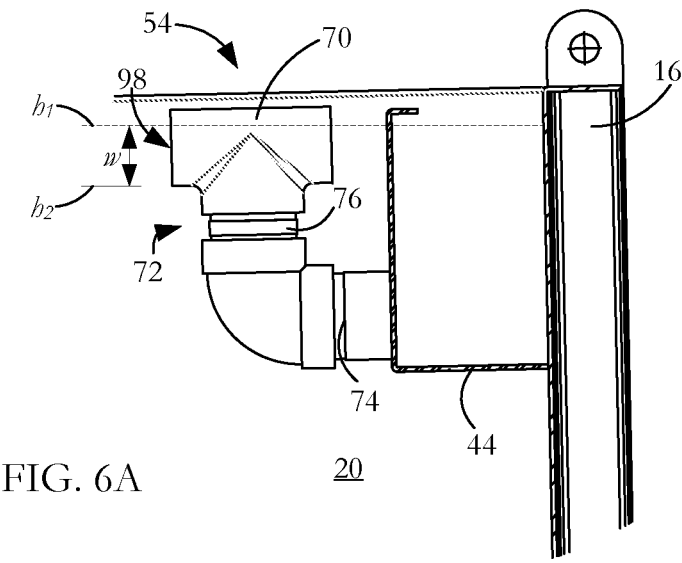
FIG. 6A is a view corresponding to FIG. 6 but showing a container forming part of the apparatus laterally tilted in a first direction
Figure 6B:
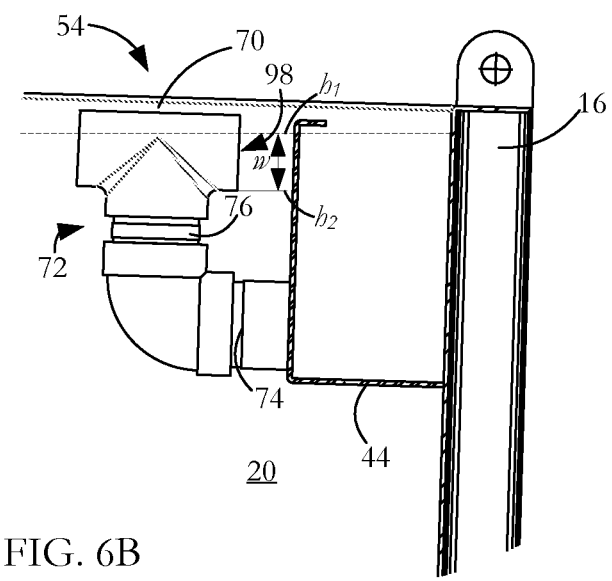
FIG. 6B is a view corresponding to FIG. 6A but showing the container laterally tilted in direction opposite to the first direction

As shown in FIGS. 6A and 6B, a container may be deployed on ground sloping laterally downward from right to left (FIG. 6A) or left to right (FIG. 6B). In both configurations, because of the linear arrangement of the left hand orifices (FIG. 6A) and right hand orifices (FIG. 6B), the pipe sections 70 again draw exactly the same width w between heights $h_1$ and $h_2$ regardless of the position along the length of the container. To change the width w to compensate for a lateral tilt of the container, all of the water exit units are raised or lowered by an equal amount. Individual height adjustment of the draw units 54 in relation to the height of the container can therefore be tailored to any combination of end-to-end and side-to-side tilt of the container.

While the linear arrangement of identical exit units 54 of the FIG. 1, 6 embodiment ensures a common draw of water of layer width w, a common layer draw can be obtained in alternative embodiments in which the exit units are neither linearly aligned nor identical in configuration. In such alternative embodiments, the positional arrangement and/or individual configuration of the exit units are differently designed but are such that a common layer draw is obtained from the exit units. Although the exit orifices 98 in the illustrated embodiments are circular, orifices of alternative shape can be adopted. Further, the pipe sections 70 can alternatively be single orificed vented pipe section so that water from the draw or common layer enters the single orifice before flowing down the transfer channel.

It will be appreciated that compensation for sloping ground can be achieved by alternative designs of adjustable components. For example, the variation in water level relative to the container base can be accommodated by having saw-tooth formed side upper sections that are height adjustable relative to the side wall 16 of the container and which are leveled on site to get even flow of cleaned water drawn into the outlet trough 44 regardless of the position along the length of the tank. A functionally similar design can have V-notch weirs emptying into the outlet trough 44, the weirs being individually adjustable in height relative to the tank wall 16. In yet a further alternative, a movable plate having a weir pattern is mounted to the side of the outlet trough 44 and adjusted and bolted into place once on site to deal with leveling issues.

Figure 10:
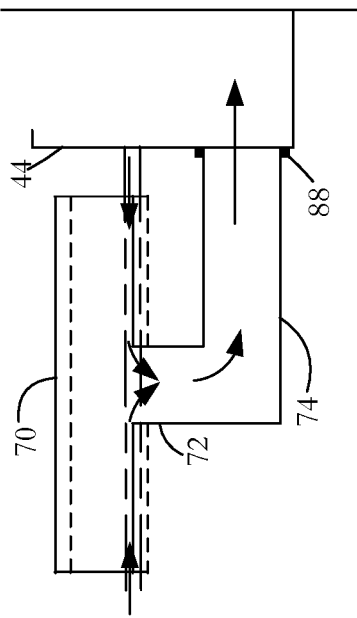
FIG. 10 is a side view of the water exit unit of FIG. 9.
Figure 9:
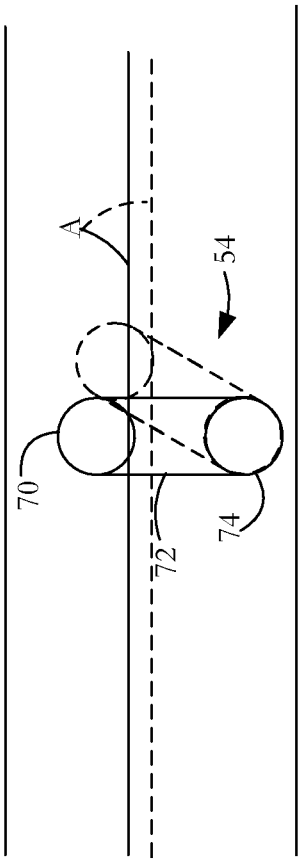
FIG. 9 is an end view of a water exit unit according to an embodiment of the invention.

A further variation of the water exit unit is shown in FIGS. 9 and 10, this embodiment of the invention having a height adjustment mechanism different from the previously described embodiments. The water exit unit 54 is angularly adjustable about an axis parallel to the central axis of the pipe section 74, such angular adjustment resulting in the raising or lowering of the pipe section 70. In the embodiment illustrated in FIGS. 9, 10, the complete assembly of the pipe section 70, the down pipe 72 and the pipe section 74 are rotated about the central axis of the pipe section 74. Junction 88 between the pipe section 74 and the wall of the of the exit trough 16 has a rotary seal to permit angular movement of the pipe section 74 relative to the trough wall while preventing escape of water being conveyed from the pipe section 74 into the exit trough 16.

Figure 12:
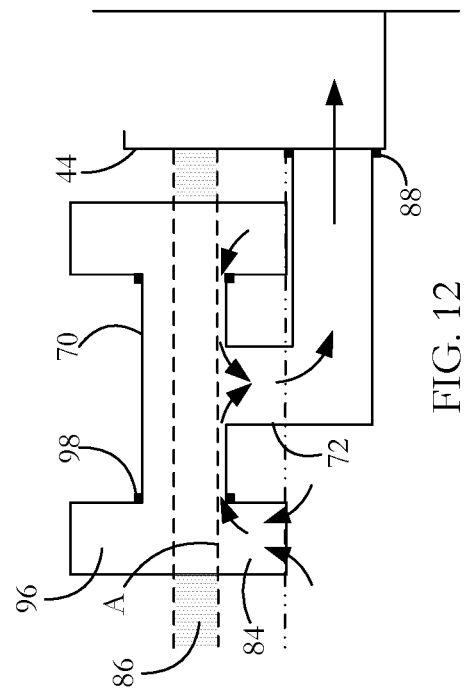
FIG. 12 is a side view of the water exit unit of FIG. 11.
Figure 11:
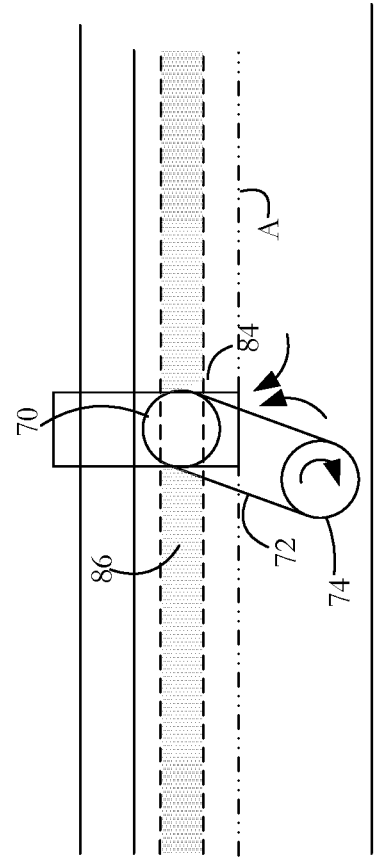
FIG. 11 is an end view of a further water exit unit according to an embodiment of the invention.

A variation of the water exit unit 54 illustrated in FIGS. 11, 12 is particularly adapted for reducing the amount of floating material such as oils or foams within the cleaned water that is drawn off. The water exit unit 54 has at each end of the horizontal pipe section 70 contiguous, downwardly extending stub pipes 84, the ends of the stub pipes 84 being below the lowest level of the horizontal section 70. In use, water is drawn into lower ends of the stub pipes 84 from a layer of water centered at level A and is gravity fed from the stub pipes 84 into horizontal pipe section 70 and then into vertical pipe section 72. However, any floating oil and foam occupying a layer 86 is prevented from entering the pipe section 70 by the walls of the stub pipes 84. The oil and foam is allowed to accumulate pending use of an oil/foam extraction process in which the oil and foam is skimmed off but not in such a way as to allow it to enter the clean water trough. The structure has vent pipe sections 96 which are open to the atmosphere and which serve substantially to prevent syphoning of water through the stub pipes 84 and the horizontal pipe section 70 which might otherwise act to drag material from the foam/oil layer 86 into the outlet trough 44. The unit illustrated in FIGS. 11, 12 is of the angular rotation type shown in FIG. 9, 10 but could alternatively be implemented with a different height adjustment mechanism such as the screw adjustment previously described. Unlike the water exit units previously described, the unit of FIGS. 11, 12 is not a skimmer unit because the water exit units draw water only from a common layer that is below the water surface level. The aligned pipe sections 84, 96 have rotary seals 98 at their junction with pipe section 70 which enables the aligned pipe sections 84, 96 to be maintained in a vertical orientation so that as the assembly is turned through a desired angle at rotary seal 88 corresponding to the depth of the layer 86, the plane of inlet orifice 90 is kept horizontal. This is desirable in order to ensure a relatively even water flow into the aperture 90 from a common layer of the water.

Figure 14:
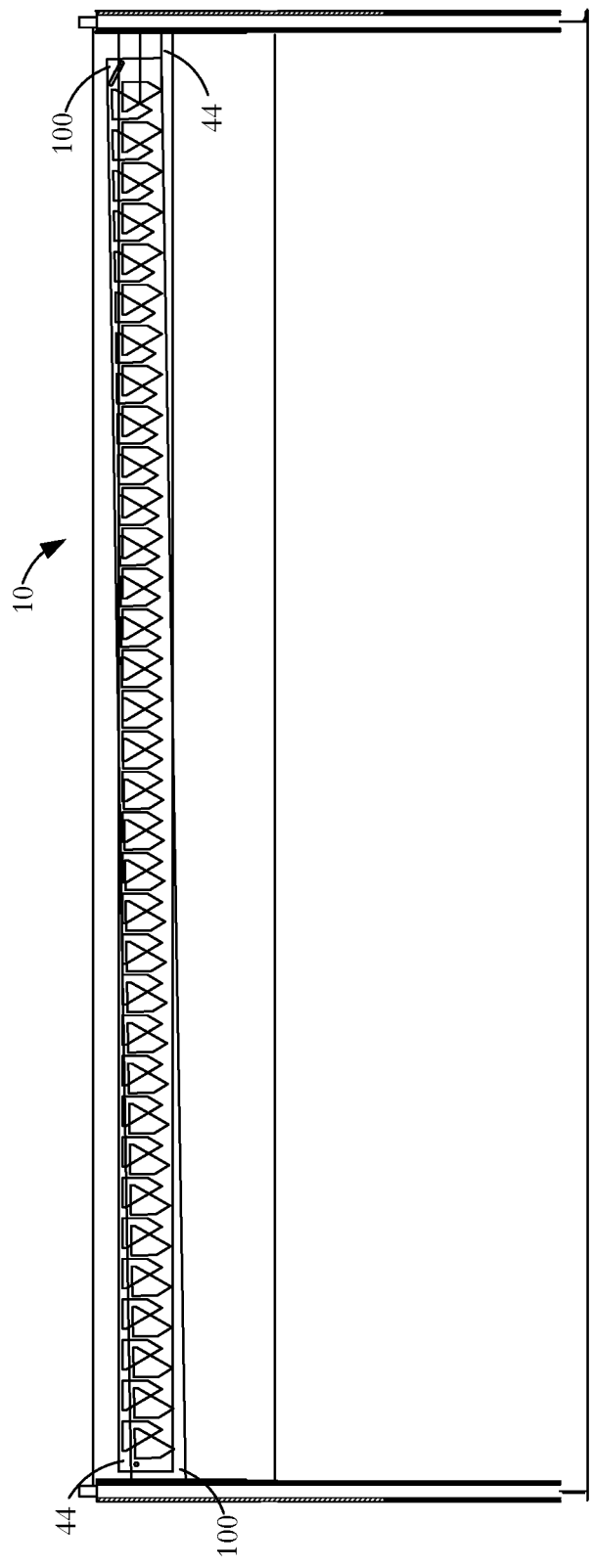
FIG. 14 is a view of a water exit arrangement for water clarifying apparatus according to an embodiment of the invention.
Figure 15:
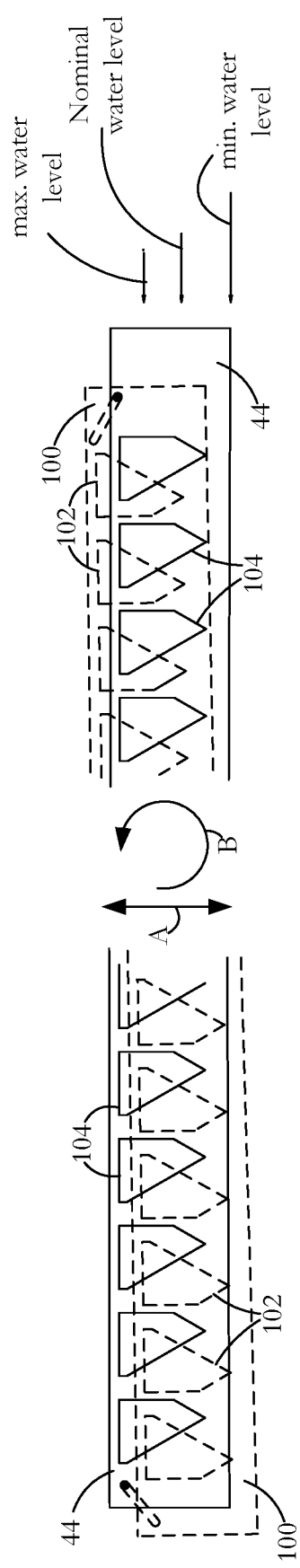
FIG. 15 is a view to a larger scale of certain parts of the apparatus of FIG. 14.

A water exit unit is alternatively implemented as a movable plate having an aperture, the plate overlapping an aperture in the outlet trough wall bounding the clarification zone so that, in an area of coincidence of the apertures, water is free to flow from the clarification zone into the outlet trough. A particular embodiment of this arrangement, as shown in FIGS. 14 and 15, is used where it is desired to compensate for a clarifier which is installed on sloping ground. As shown, in FIG. 14, the clarifier 10 has an elongate water exit plate 100 extending down its length, the plate 100 having a regular series of generally triangular apertures 102 extending it through it. The side wall of the outlet trough 44 is formed with a corresponding set of equally spaced generally triangular apertures 104. Referring to FIG. 15, there are shown to a larger scale, end portions of the water exit plate 100 and the outlet trough wall at each end of the clarifier tank. The wall of the outlet trough 44 is shown in full line. The apertures 104 are of identical shape and size, and are equidistantly spaced along the outlet trough wall, the lower parts of the apertures 104 being triangular. The adjustable water exit plate 100 is shown in broken line. The apertures 102 are of identical shape and size, and are equidistantly spaced along the plate, the lower parts of the apertures also being triangular.

As represented by the arrow A, mounting of the plate 100 to the trough wall allows the plate height to be altered relative to the outlet trough wall. This means that height in the clarifier tank from which water can be skimmed as necessary depending on how full the tank is. The adjustment can be implemented manually. Alternatively, the adjustment is automatically motor driven using a controller having an input indicating clarifier water depth. As represented by the arrow B, mounting of the plate 100 to the side wall of the trough 44 allows the angular position of water exit plate 100 to be altered relative to the outlet trough wall. This provides the ability to compensate for the clarifier 10 being installed on ground that slopes from end to end of the clarifier. The adjustment can be implemented manually. Alternatively, the adjustment is automatically motor driven using a controller having an input indicating ground slope. The offset V-form of the respective apertures 102, 104 provides one form of overlapping aperture where an angular rotation of the plate 100 can be achieved while still maintaining a linear line of water exit regions 106, the line corresponding to the depth of the water in the clarifier. It will be appreciated that other shapes of overlapping apertures can be implemented to achieve the same function. The mounting of the water exit plate to the trough wall allows for a compound movement necessary to achieve both the height translation and the angular rotation. It will be further appreciated that the water exit arrangement can be implemented with two water exit plates, with common adjustment of the two plates relative to the trough wall to adjust for height and with adjustment of the plates relative to one another to provide angular adjustment for ground slope compensation.

As shown in FIG. 2, the bottom of the clarification zone 26 is defined by walls 78, 80 which are configured as a V. The angles of the V-form floor 78, 80 are set sufficiently steeply that sludge does not settle on them but, instead, slides down and collects in the crook 58 of the V. The sludge thus automatically collects in a relative confined zone to facilitate its removal by operator control using a vacuum truck. In the embodiment shown, one side 78 of the V extends up into the settling zone 24 which allows the two sides 78, 80 to be joined together so as to maintain the desired slide angle while keeping the height of a prefabricated unit within the constraints set by shipping on a flatbed truck. Automated valve and sludge pump combinations 81 are located at discharge points 82 at roughly two feet intervals along the bottom of the V-form floor 78, 80 and are periodically actuated to draw off collected sludge. There is a tendency for sludge mounts to accumulate between the discharge points 82, but with the design shown, an operator standing on the catwalk 32 can see sludge mounts as they develop and push them down into the valves with a broom. Alternatively, a rail-mounted sludge plough system (not shown) is installed for operation at the sludge collection region, the plough being driven up and down the tank to knock over the mounts and to direct the sludge onto the valve/pump combinations 81 prior to pumping out the collected sludge through the valves.

Operators can use a vacuum truck to suck sludge out all along the length of the bottom of the clarifier via the side platform 32 and an access path through the settling zone, the side platform being designed so that it can be folded down and secured for easy shipping and installation. This can be done without draining the clarifier. Access can also be gained through a hatch 84 when the container is drained for servicing or repair. The illustrated clarifier is particularly valuable for construction sites where the demands of dewatering typically demand the use of large open tanks with no clarification media so that sludge can be sucked out of the bottoms of the tanks through the open tops. Without the use of clarification media, such clarifier installations might typically require 4 or 6 tanks 40 feet long in series to achieve a comparable flow capacity as is offered by the "longbox" clarifier illustrated.

Figure 13:
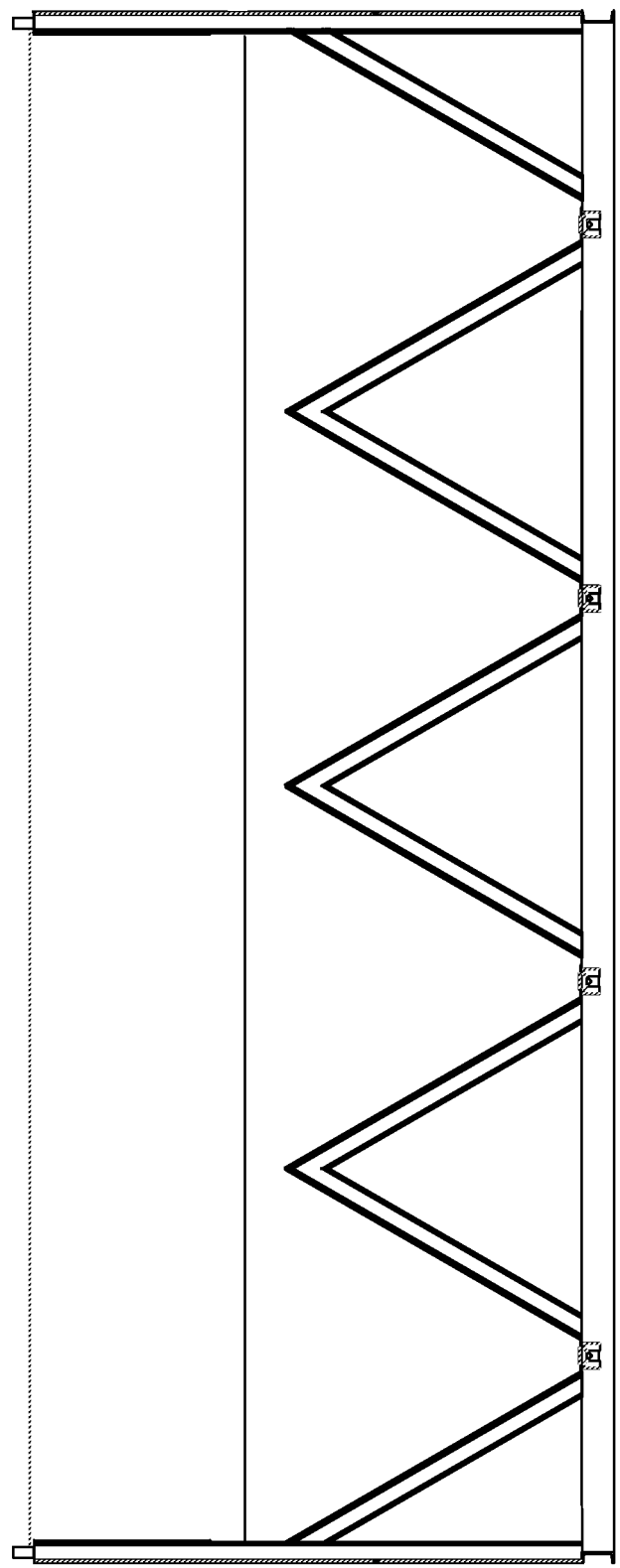
FIG. 13 is a longitudinal sectional view of another embodiment of water clarifying apparatus according to an embodiment of the invention.

An alternative configuration for the bottom region of the clarifier tank is illustrated in FIG. 13, this being essentially a series of generally square, downwardly tapering hoppers 92. Each of the hoppers has side walls 94 sloped at the desired angle (of the order of 55 degrees to the horizontal) to prevent sludge accumulating on the walls and to funnel the sliding sludge to collection points 58 where automated valve and sludge pump combinations 81 are located. This configuration represents a more complex floor profile than that described with reference to FIG. 2, but obviates the need for a sludge plough.

Figure 8:
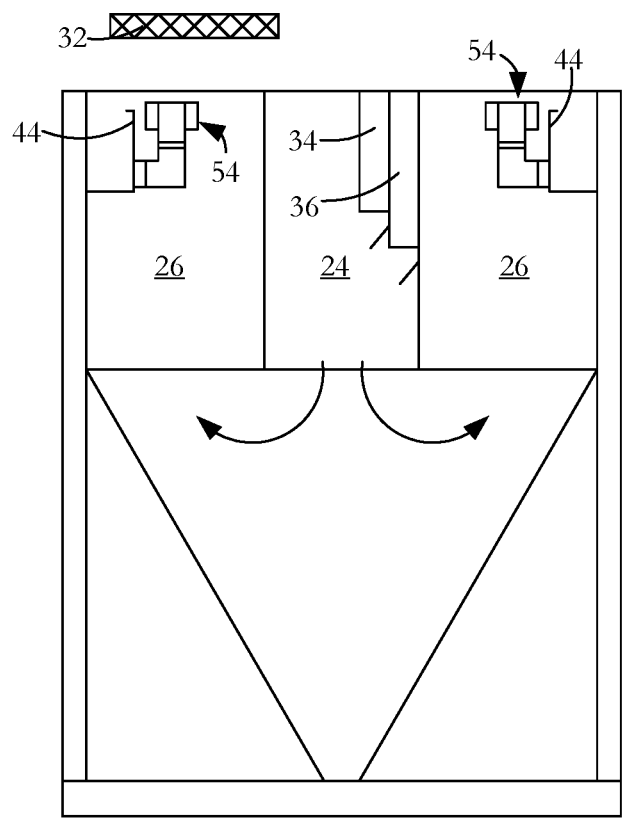
FIG. 8 is cross-sectional view of another embodiment of water clarifying apparatus.

While the illustrated clarifier uses tube media for precipitating clarification, it will be appreciated that other forms of clarification media such as sloping lamellar plates can be used. Indeed, in another embodiment of the invention, the clarifier does not use clarification media at all. Particles that fall faster than the water is rising towards the outlet water exits drift down to the bottom of the clarifier without the presence of flocculating media. In such an embodiment, a design modification as shown in FIG. 8 is preferred in which the two outside walls 14, 16 each have an associated exit trough and water exit tee pipes for receiving cleaned water. In this embodiment, there are two clarification zones 26 and an intermediate settling zone 24. Inlet troughs extend generally centrally down the length of the tank and define one side of the settling zone. The wastewater flows down the selected inlet trough and out of the holes in its base to establish flow from the centre outwards instead of, as in the case of the FIG. 1 embodiment, from one side to the other. It will be appreciated that for a particular inlet flow rate from the tank 38, the flow rate laterally across the tank either to one or other of the outlet troughs is halved in comparison with the FIG. 1 embodiment. This embodiment permits access from a catwalk 32 above the settling zone to sludge in the bottom of the tank. The sludge can be viewed from the catwalk and can be accessed from above if required for troubleshooting without having to empty the clarifier tank.

It will be appreciated that the illustrated designs of clarifying apparatus enable a pre-fabricated structure that is convenient for shipping. In particular, shipping constraints generally set an upper limit on cross-sectional dimensions: height and width. The illustrated clarifier design in terms of juxtaposition, size and orientation of constituent elements provides an effective solution from the viewpoint of such shipping constrictions. In the example shown, the detailed dimensions are a width of 7' (9' including the catwalk 32), a depth of 9' and a length of 32' to 40', so enabling the prefabricated box container to be shipped on a conventionally sized flatbed truck. However, it will be realized that any or all of such juxtaposition, size and orientation of constituent elements can be altered if the shipping constraints do not exist or if other installation or operating criteria make such alteration desirable.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. Apparatus for treating water comprising:
    a container,
    a water inlet arrangement having a plurality of water inlet holes positioned along the length thereof for water entry into the container at positions along said length, the water inlet arrangement operable to cause flows of water through the water inlet holes and into the container having the same flow rate along the length of the water inlet arrangement,
    a plurality of water exit units positioned along the length of the container, the water exit units having respective outlet orifices at least partially immersed in water contained in the container and positioned along the container length for enabling water outlet from the container at positions along the container length, each one of said plurality of water exit units having
        a generally horizontal pipe extending along a longitudinal axis that is transverse to the container length and in a plane perpendicular to the container depth, said horizontal pipe terminating at a first longitudinal end at a first orifice and at a second longitudinal end at a second orifice of like geometry to said first orifice, each of said first and second orifices configured to draw off water from said container, and
        a common outlet intermediate between said first orifice and said second orifice, said common outlet draining liquid from said horizontal pipe,
    wherein respective parts of each of said first and second orifices define a lower boundary of a common layer of the water drawn into said water exit units from said container, and wherein respective second parts of each of said first and second orifices define an upper boundary of said common layer of the water drawn into said water exit units from said container,
    a clarification zone intermediate the water inlet arrangement and the water exit units,
    wherein the water inlet holes and the outlet orifices are positioned to cause a gravity induced, balanced, even flow of water across the container from the water inlet ports, through the clarification zone to the outlet orifices,
    each of the water exit units having a respective height adjustment mechanism for differentially adjusting heights of certain ones of the water exit units relative to other of the water exit units whereby to maintain said balanced, even flow regardless of tilt of the container.

2. The apparatus as claimed in claim 1, wherein the height adjustment mechanism is a screw mechanism.

3. The apparatus as claimed in claim 1, wherein the height adjustment mechanism is an angular rotation mechanism.

4. The apparatus as claimed in claim 1, wherein said plurality of water exit units further comprise:
    generally downwardly extending pipes contiguous with and coupled to respective ones of the generally horizontally extending pipes at said common outlet between said first and second orifices and configured to receive said water drawn from said container through said first and second orifices;
    second horizontally extending pipe sections defining a longitudinal axis parallel to and offset from said horizontal pipe longitudinal axis; and
    a pivotal coupling configured to allow manual rotation of respective ones of said horizontal pipes and said generally downwardly extending pipes about respective ones of said second horizontally extending pipe sections longitudinal axis.

5. The apparatus as claimed in claim 1, further comprising an outlet trough to receive the clarified water from the water exit units.

6. The apparatus claimed in claim 1, wherein the water exit units includes respective vent pipes for preventing siphoning of water through the water exit units.

7. The apparatus as claimed in claim 1, wherein the water exit units are mounted to the container.

8. The apparatus as claimed in claim 1, wherein said plurality of water exit units are linearly arranged along said length of the container parallel with a base of said container and draw evenly from a common layer of water as water is drawn through the apparatus.

* * * * *